United States Patent
Menard et al.

(10) Patent No.: US 9,715,369 B2
(45) Date of Patent: Jul. 25, 2017

(54) VEHICLE ACCESSORY ENGAGEMENT TRACKING

(71) Applicant: University of Alaska Anchorage, Anchorage, AK (US)

(72) Inventors: Timothy Menard, Las Vegas, NV (US); Jeffrey Miller, Anchorage, AK (US); John Andrew Lund, Anchorage, AK (US)

(73) Assignee: University of Alaska Anchorage, Anchorage, AK (US)

( * ) Notice: Subject to any disclaimer, the term of this patent is extended or adjusted under 35 U.S.C. 154(b) by 0 days.

(21) Appl. No.: 14/045,306

(22) Filed: Oct. 3, 2013

(65) Prior Publication Data

US 2014/0094994 A1    Apr. 3, 2014

Related U.S. Application Data

(60) Provisional application No. 61/709,264, filed on Oct. 3, 2012.

(51) Int. Cl.

| G06F 7/00 | (2006.01) |
|---|---|
| G08G 1/00 | (2006.01) |
| G07C 5/00 | (2006.01) |
| G07C 5/08 | (2006.01) |
| G08G 1/01 | (2006.01) |

(52) U.S. Cl.
CPC .............. *G06F 7/00* (2013.01); *G07C 5/008* (2013.01); *G07C 5/0816* (2013.01); *G08G 1/20* (2013.01); *G08G 1/0112* (2013.01); *G08G 1/0129* (2013.01)

(58) Field of Classification Search
None
See application file for complete search history.

(56) References Cited

U.S. PATENT DOCUMENTS

| 8,467,968 | B1* | 6/2013 | Dolinar et al. ............... 701/534 |
|---|---|---|---|
| 2004/0195357 | A1* | 10/2004 | Doherty et al. ............. 239/172 |
| 2005/0103103 | A1* | 5/2005 | Newman ................. G01F 23/32 73/313 |
| 2005/0246088 | A1* | 11/2005 | Doherty et al. ................ 701/80 |
| 2006/0220638 | A1* | 10/2006 | Urquidi .................... B60G 7/02 324/207.25 |
| 2009/0195243 | A1* | 8/2009 | Kasajima et al. ........ 324/207.25 |
| 2011/0018536 | A1* | 1/2011 | Mullen ................ G01R 33/307 324/307 |
| 2011/0298638 | A1* | 12/2011 | Groeneweg ................... 340/905 |
| 2012/0046100 | A1* | 2/2012 | Roman et al. .................. 463/30 |
| 2012/0296683 | A1* | 11/2012 | Groeneweg ............ G06Q 10/06 705/7.13 |
| 2013/0001924 | A1* | 1/2013 | Adamczyk et al. .......... 280/511 |

(Continued)

*Primary Examiner* — John R Olszewski
*Assistant Examiner* — Navid Ziaeianmehdizadeh
(74) *Attorney, Agent, or Firm* — Ballard Spahr LLP

(57) ABSTRACT

Methods, systems, and devices are disclosed for estimating environmental conditions. An example method can comprise determining location information associated with a vehicle and determining status information indicative of time periods when one or more vehicle accessories are engaged. An example method can also comprise providing the location information and the status information to a device configured to estimate environmental conditions based on the location information and the status information.

19 Claims, 14 Drawing Sheets

(56) References Cited

U.S. PATENT DOCUMENTS

| | | |
|---|---|---|
| 2013/0018577 A1* | 1/2013 | Gooding ........................ 701/423 |
| 2013/0110285 A1* | 5/2013 | Kadaba .......................... 700/240 |
| 2013/0184938 A1* | 7/2013 | Dolinar et al. .................. 701/41 |
| 2013/0190981 A1* | 7/2013 | Dolinar et al. .................. 701/41 |
| 2013/0212912 A1* | 8/2013 | Guggino et al. ................. 37/197 |
| 2014/0067265 A1* | 3/2014 | Maston .............. G01C 21/3697 701/533 |
| 2014/0224377 A1* | 8/2014 | Bonefas ........................... 141/1 |

* cited by examiner

FIG. 4
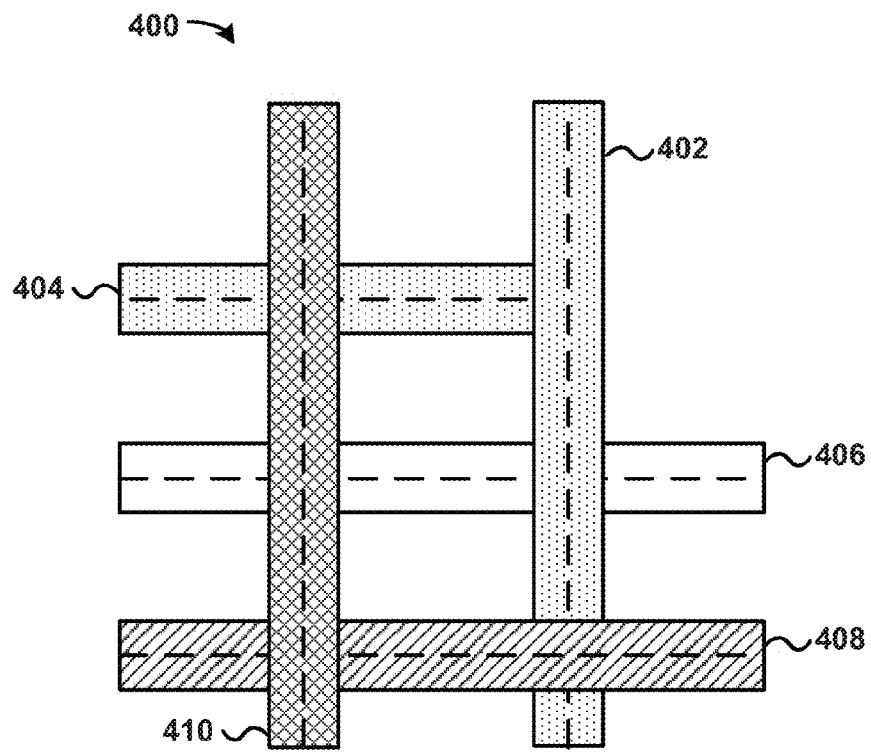
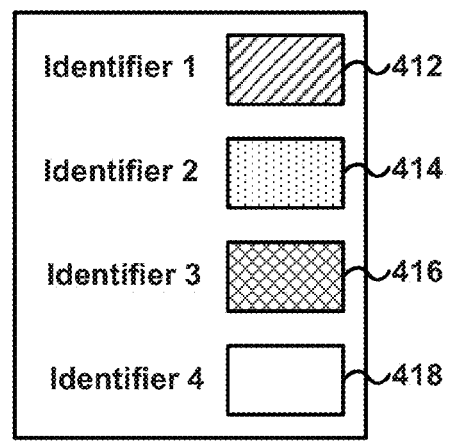

VEHICLE ACCESSORY ENGAGEMENT TRACKING

CROSS REFERENCE TO RELATED PATENT APPLICATION

This application claims priority to U.S. Provisional Application No. 61/709,264 filed Oct. 3, 2012, herein incorporated by reference in its entirety.

SUMMARY

It is to be understood that both the following general description and the following detailed description are exemplary and explanatory only and are not restrictive, as claimed. Provided are methods, systems, and devices for estimating environmental conditions. An example method can comprise determining location information associated with a vehicle and determining status information indicative of time periods when one or more vehicle accessories are engaged. An example method can comprise providing the location information and the status information to a device configured to estimate environmental conditions based on the location information and the status information.

In another aspect, an example method can comprise receiving location information associated with a vehicle and receiving status information indicative of time periods when one or more vehicle accessories are engaged. An example method can further comprise estimating environmental conditions based on the location information and the status information.

In another aspect, an example system can comprise an accessory coupled to a vehicle. The system can comprise a location unit configured to determine location information indicative of locations of the vehicle. The system can also comprise a status unit configured to determine status information indicative of when the accessory is engaged. The system can further comprise a communication unit configured to transmit the location information and the status information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 23 is a side-view illustrating an exemplary device with an accessory that is engaged;

FIG. 4 is a top-down view illustrating an exemplary map configured to forecast driving conditions;

DETAILED DESCRIPTION

Figure 1:
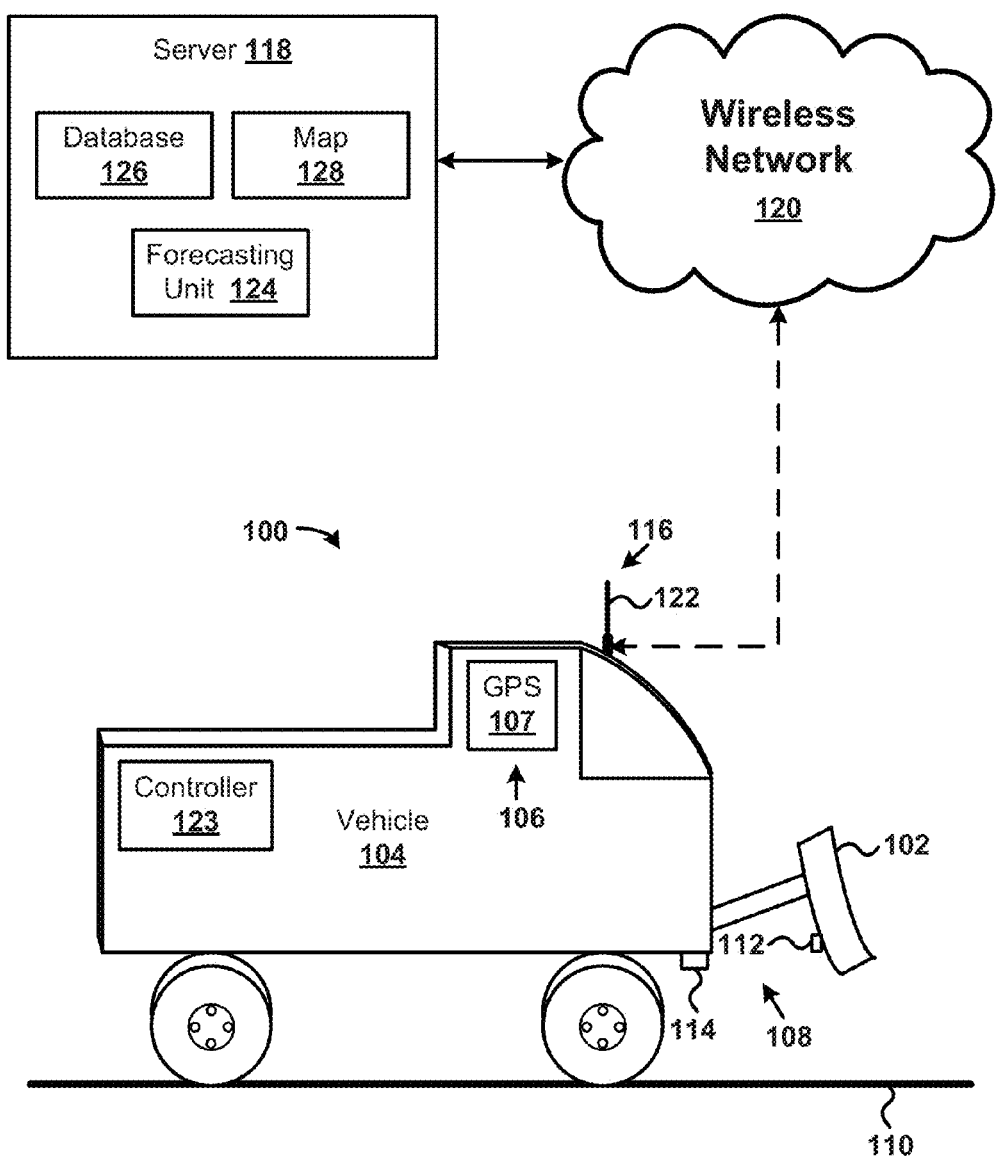
FIG. 1 is a side-view illustrating an exemplary device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a side-view illustrating an exemplary device 100. In one aspect, the device 100 can comprise an accessory 102 coupled to a vehicle 104. For example, the vehicle 104 can comprise a dump truck, road grader, pickup truck, car, or the like. In one aspect, the accessory 102 can comprise a snow plow, grader, paver, vehicle brakes, vehicle accelerator, and the like. For example, the vehicle 104 can be configured for plowing snow with the accessory 102. The accessory 102 can comprise a blade and a mechanical arm coupling the blade to the vehicle 104. As another example, the vehicle 104 can be configured for controlling movement (e.g., braking, accelerating), operating upon a travel area (e.g., roadway), or otherwise performing operations relevant to the vehicle 104.

The device 100 can comprise a location unit 106 configured to record one or more locations of the vehicle 104 and/or accessory 102. For example, the location unit 106 can record a history of locations of the vehicle 104 as the vehicle 104 travels along one or more roadways 110. In one aspect, the location unit 106 can comprise a global positioning system (GPS) device 107. For example, the location unit 106 can record a GPS coordinate or other spatial coordinate for each of the one or more locations. As an illustration, the GPS device 107 can comprise an EM-406A GPS module from USGlobalSat. This example GPS device 107 can be based on a 20 channel SiRF StarIII receiver chipset. Additionally, the GPS device 107 can use a USART interface to receive AT commands and return GPS information in a standard NMEA format. According to some aspects, the GPS device 107 can be configured for identifying the position of the vehicle 104 on a roadway 110. For example, the EM-406A can be configured for 10 meter accuracy (e.g. or 5 meters with WAAS).

The device 100 can also comprise a status unit 108 configured to determine one or more times when the accessory 102 is engaged. For example, the status unit 108 can determine the position of the accessory 102. As an illustration, if the accessory 102 is a snow plow, the status unit 108 can determine when the snow plow is engaged in plowing snow. As another illustration, the status unit 108 can determine when vehicle brakes, accelerators, steering wheels, or other devices are engaged. In one aspect, the status unit 108 can comprise a system for determining at least one of a height of the accessory 102 above the roadway 110 or an angle of the accessory 102 with respect to the roadway 110. For example, the status unit 108 can comprise at least one magnet 112 attached to the accessory 102. The status unit 108 can further comprise a sensor 114. The status unit 114 can comprise additional sensors, for example, to measure multiple degrees of freedom of the accessory 102. The sensor 114 can be configured to detect a strength of a magnetic field of the magnet 112. For example, the strength of the magnet 112 detected at the sensor 114 can vary according to the position (e.g., distance) of the magnet from the sensor 114. In an aspect, the sensor 114 can be configured to determine a voltage caused by at least a portion of the magnetic field of the magnet 112. For example, the sensor 114 can comprise a Hall Effect sensor. In one aspect, the magnet 112 can be a magnet with sufficient Gauss to affect the output voltage of the sensor 114 according to the distance of the magnet 112 from the sensor 114. For example, the magnetic field strength of a magnetic dipole can attenuate with distance as a function of 1/R, where R is indicative of distance between the sensor 114 and the magnet 112. In an aspect, the magnet 112 can comprise a Rare Earth metal, such as neodymium. As an illustration, the magnet 112 can be a Nickel-Copper-Nickel Plated NdFeB Magnet. The Nickel-Copper-Nickel Plated NdFeB magnet can have an approximate magnetic flux density of 13 kG close to the surface of the magnet. The example NdFeB magnet can provide a field of sufficient strength to produce the maximum voltage output of the sensor. As another illustration, the magnet 112 can be a neodymium-iron-boron magnet. The neodymium-iron-boron based magnet can have a lower magnetic field of approximately 2 kG.

In an aspect, the device 100 can comprise a communication unit 116 configured to transmit to a server 118 location information and status information associated with the vehicle 104. For example, the location information can comprise one or more locations of the vehicle 102. The status information can comprise information indicative of engagement of the accessory 102. For example, the status unit can comprise information indicative of one or more positions of the accessory 102. The location information and status information can be associated with various times. The communication unit 116 can be configured to transmit the location information, status information, and any other relevant information to the server 118 through a wireless network 120. The wireless network 120 can be configured for wireless network connections and wired network connections. For example, the communication unit 116 can comprise an antenna 122 configured to transmit and receive information. In one aspect, the wireless network 120 can be a cellular network, a wireless LAN, an RF network of any type, and the like. As an illustration, the communication unit 116 can comprise a cellular modem. For example, the cellular modem can comprise an SM5100B quad-band GSM 850/EGSM 900/DCS 1800/PCS 1900 module. This cellular modem can be in an Arduino-compatible format or shield. The modem can comprise a modem controller configured to receive and respond to AT commands via a USART interface.

In one aspect, the device 100 can comprise a controller 123. The controller 123 can comprise, for example, a microcontroller. In one aspect, the controller 123 can receive status information from the status unit 108. The controller 123 can also receive location information from the location unit 106. The controller 123 can provide the location information and status information to the communication unit 116. For example, the controller 123 can instruct the communication unit 116 to provide the location information and status information to the server 118. As an illustration, the controller 123, can comprise an Arduino Uno, which is a microcontroller board based on the Atmel ATmega328P microcontroller. This example controller 123 can comprise 32 KB of program space and 2 KB of SRAM, which in some scenarios can be more than sufficient for the specified application. Additionally, the example controller 123 can comprise eight 10-bit ADC inputs which have a maximum reliable conversion time of approximately 15 μs. In an aspect, a universal synchronous/asynchronous receiver/transmitting (USART) can be used with the microcontroller. Additionally, software implemented serial controllers can be used to access multiple devices using USART communication. It should also be noted that the controller 123 can be configured as an 8-bit microcontroller which runs at 16 MHz in our system (20 MHz maximum). It should be noted, however, that other controllers are contemplated for various embodiments. By way of further illustration, the controller 123 can be programmed using the Arduino development environment. The Arduino development environment can provide a text editor in the language of C as well as a communicable text console to the controller 123. Through the use of an open source programming library, such as NewSoftSerial, a number of virtual UART's can be created to provide communication to multiple hardware devices.

In one aspect, through the use of the communication unit 116 (e.g., cellular modem), a TCP/IP connection or other network based connection can be established to allow for a continuous stream of data to be communicated between the server 118 and the device 100. The stream of data can comprise the location information and status information. As a further illustration the location information and status information can comprise data indicating the vehicle's position (latitude, longitude), direction (e.g., in degrees, north is 0/360), vehicle speed, altitude, timestamp, blade position measurements, and/or the like. An example format of the stream of data can comprise "DeviceID|Latitude|Longitude|Speed|Direction|Altitude|Time stamp|Hall Effect Sensor 1|Hall Effect Sensor 2@".

In another aspect, the server 118 can comprise a forecasting unit 124 configured for processing information received from one or more vehicles 104. The server 118 can comprise a database 126 configured for storing the status information and the location information. For example, the database 126 can be configured to store one or more field strength values and/or one or more voltage values received from the status unit 108 and one or more location values from the location unit 106. By way of further explanation, a magnetic field value can be a measurement or calculation of an amount of magnetic force on a moving electric charge determined at a particular location, e.g., at the sensor 114. A voltage value can comprise a measurement or a calculation of the electric potential difference between two points at a particular location, e.g., at two points within a material in the sensor 114. Additionally, the forecasting unit 124 can be configured to estimate environmental conditions. For example, the forecasting unit 124 can be configured to estimate travel conditions based on the status information and location information received from one or more devices 100. The forecasting unit 124 can be configured to generate a map 128 representing the estimated environmental conditions. For example, the forecasting unit 124 can comprise a real-time traffic simulator, such as FreeSim, configured to aggregate data and display the data to the public via a web interface.

Upon arrival at the server 118, the location information and status information can be used to determine the status of the vehicle 104 at various locations and times. To indicate whether the vehicle accessory 102 is engaged, a threshold can be determined. The status information can be compared to the threshold. As an illustration, if the accessory is a snow plow blade, the threshold can be used to determine whether the vehicle is plowing or traveling without plowing. The threshold can represent a maximum height above the ground at which the snow plow blade can still be considered to be engaged in plowing snow. If the blade position is below the threshold, then the snow plow blade can be determined to be engaged in plowing snow. If the snow plow blade is above the threshold, the snow plow blade can be determined to not be engaged in plowing snow. In one aspect, the threshold can be from about 0.5 inches to about 5 inches above the surface of the roadway. For example, the maximum height above the ground can be set to one-inch.

Figure 2A:
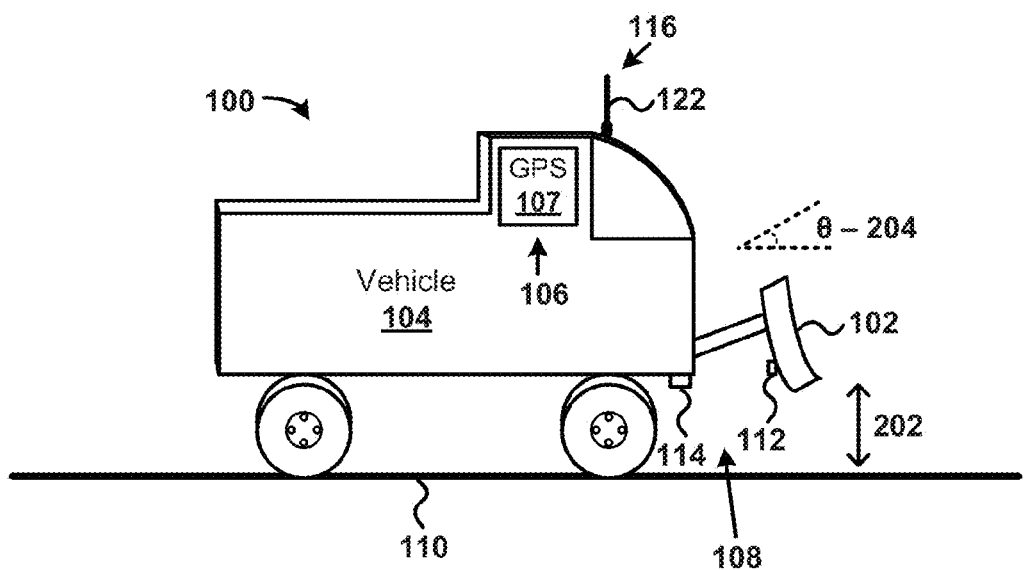
FIG. 2A is a side-view illustrating an exemplary device that is with an accessory that is not engaged.
Figure 2B:
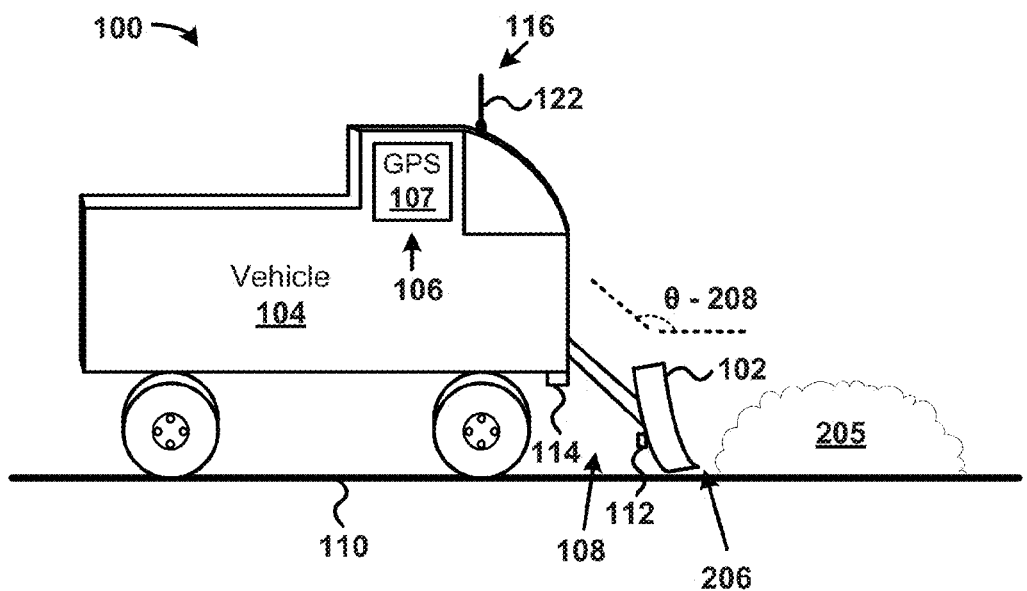

FIG. 2A and FIG. 2B are side-views illustrating exemplary accessories and vehicles. FIG. 2A is a side-view illustrating an example vehicle with an accessory 102 (e.g., plow) that is disengaged (e.g., from plowing). In one aspect, the accessory 102 is a first height 202 above the roadway 110. In another aspect, the accessory 102 can be oriented at a first angle 204. The first angle 204 can be oriented with respect to the surface of the roadway 110. For example, the first angle 204 can define a tilt of the accessory 102 with respect to the surface of the roadway 110.

FIG. 2B is a side-view illustrating an exemplary accessory 102 that is engaged. For example, the accessory 102 (e.g., a plow) can be engaged in plowing snow 205. In one aspect, the accessory 102 can be a second height 206 above the roadway 110 while the accessory 102 is engaged in plowing snow 205. The second height 206 can be less than the first height 202. For example, the accessory 102 can be in contact with the roadway 110 and/or less than a predefined height. An exemplary predefined height can be from about 0.5 inches to about 5 inches above the surface of the roadway 110. For example, the predefined height can be 1 inch. In another aspect, the accessory 102 can be oriented at a second angle 208. The second angle 208 can be oriented with respect to a surface of the roadway 110 and define a tilt of the accessory 102 with respect to the surface of the roadway 110. The second angle 208 can be different than the first angle 204. For example, the second angle 208 can be less than 90 degrees and the first angle 204 can be greater than 90 degrees. Additionally, the second angle 208 can be greater than a threshold angle. The threshold angle can define the angle at which the accessory 102 is considered to be no longer in contact with the surfaces of the roadway 110. Thus, in some aspects, the second angle 208 can position the accessory 102 such that the accessory 102 can be configured to push snow 205 to the side of the roadway 110.

Figure 3A:
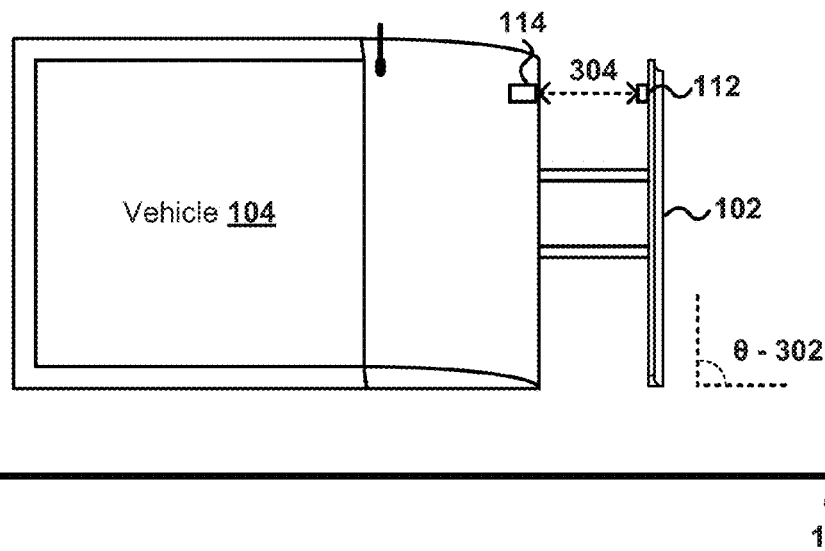
FIG. 3A is a top-down view illustrating an exemplary device with an accessory oriented at a third angle.
Figure 3B:
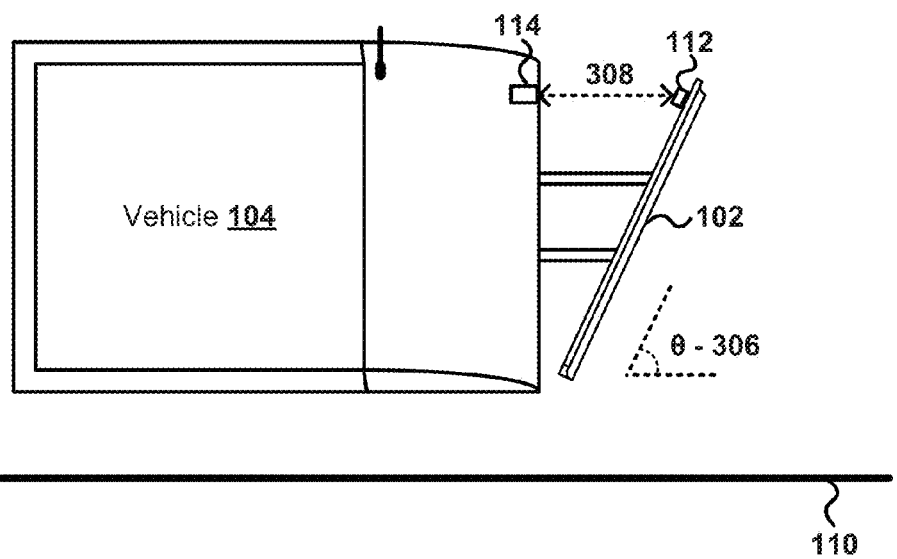
FIG. 3B is a top-down view illustrating an exemplary device with an accessory oriented at a fourth angle.

FIG. 3A is a top-down view illustrating an exemplary vehicle with an accessory 102 oriented at a third angle 302. The third angle 302 can be oriented with respect to a length and/or direction of the roadway 110. A magnet 112 attached to the accessory 102 can be a first distance 304 from the vehicle 104. FIG. 3B is a top-down view illustrating an exemplary vehicle with an accessory 102 oriented at a fourth angle 306. The fourth angle 306 can be defined with respect to a length and/or direction of the roadway 110. The fourth angle 306 can be different than the third angle 302. For example, the third angle 302 can be substantially 90 degrees or within a predefined range of 90 degrees with respect to the length of the roadway 110, and the fourth angle 306 can be substantially less than 90 degrees with respect to the length of the roadway, e.g. 75, 65, 55, 45 degrees or the like. The fourth angle 306 can be considered an appropriate angle for pushing snow to the side of the roadway. For example, the fourth angle can be below a threshold that defines when an angle is no longer considered an angle appropriate for plowing. Thus, when the accessory is positioned at the fourth angle 306, the accessory 102 can be engaged. For example, when the accessory is at the fourth angle 306, the accessory 102 can be positioned to more efficiently push snow to the side of the roadway 110.

In one aspect, a magnet attached to the accessory 102 can be a second distance 308 from the sensor 114. The first distance 304 can be different than the second distance 308. For example, when the accessory 102 is positioned for plowing snow, the magnet 112 can be the second distance 308 from the sensor 114. When the accessory 102 is not positioned for plowing, the magnet 112 can be a first distance from the sensor 114. Those of ordinary skill in the art will understand that the sensor 114 and magnet 112 can be coupled to the vehicle 104 and/or accessory 102 in a variety of locations on the vehicle 104 and accessory 102 resulting in a variety of values for the first distance 304 and the second distance 302. For example, in one aspect the first distance 304 can be greater than the second distance 308 when the accessory is engaged. In another scenario, the second distance 308 can be greater than the first distance 304 when the accessory is engaged.

In one aspect, when the magnet 112 is a first distance 304 from the sensor 114, the magnet 112 can produce a first magnetic field at the sensor 114. In one aspect, the first magnetic field can produce a first voltage value in the sensor 114. Similarly, when the magnet 112 is a second distance 308 from the sensor 114, the magnet 112 can produce a second magnetic field at the sensor 114. In one aspect, the second magnetic field can produce a second voltage in the sensor 114. The first voltage and the second voltage can be caused, at least in part, by the Hall Effect. The Hall Effect can occur when charge carriers are moving in a material through a magnetic field. The magnetic field can cause, at least in part, the positive charge carriers to move to a side of the material and the negative charge carriers to move to another side of the material, creating a voltage between the two sides of the material. The second magnetic field can be different from the first magnetic field, and the second voltage can be different from the first voltage. In one aspect, the magnet 112 can produce a variety of magnetic fields at the sensor 114 according to the distance the magnet 112 is from the sensor 114. The angle of orientation of the accessory 102 can determine, at least in part, the distance of the magnet 112 from the sensor 114. Accordingly, a variety of magnetic fields can be produced at the sensor 114 indicating the angle of orientation and/or distance of the accessory 102 from the vehicle 104. The variety of magnetic fields can be stored and transmitted to the server 118. The server 118, or other device, can determine whether the accessory 102 is engaged (e.g., in plowing snow).

FIG. 4 is a top-down view illustrating an exemplary map 400 configured to show estimated environmental conditions. For example, the map 400 can show estimated driving conditions. In one aspect, the map 400 can comprise one or more roadways 402, 404, 406, 408 and 410. At least a portion of the roadways can be associated with one or more identifiers 412, 414, 416, and 418. For example, an identifier can be overlaid above the roadway. Each identifier can comprise a color, pattern, shading, or other similar symbol, and each identifier can indicate a travel forecast associated with a roadway. For example, the travel forecast can comprise one or more of, an approximate duration of time since the associated roadway was last plowed, a difficulty of travel, an amount of snow on the roadway, speed of travel, amount of traffic, and/or other similar travel condition. In one aspect, more than one roadway 402 and 404 can be associated with the same identifier 414.

Figure 5:
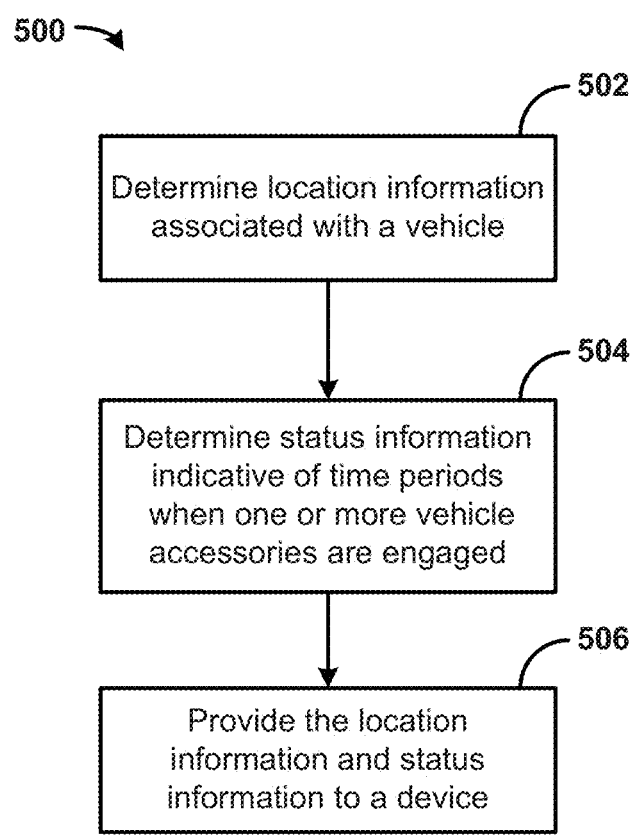
FIG. 5 is a flowchart illustrating an exemplary method for estimating environmental conditions.

FIG. 5 is a flowchart illustrating an exemplary method 500 for estimating environmental conditions. At step 502, location information associated with a vehicle can be determined. For example, a location of the vehicle can be received from a global positioning service (UPS) device. The location information can comprise latitude, longitude, elevation, and/or other units of measurement. In one aspect, the location of the vehicle can be associated with a time data, such as a time stamp indicating when the vehicle was at the location.

At step 504, status information indicative of time periods when one or more vehicle accessories is engaged can be determined. In one aspect, the vehicle accessory can comprise a snow plow, grader, paver, vehicle brakes, vehicle accelerator, and/or the like. Status information can comprise positions or other information indicative of when the one or more accessories are engaged. For example, status information can indicate when a snow plow is positioned for plowing, when a paver is positioned for paving, when a grader is positioned for grading, when a vehicle brake is positioned for braking, when an accelerator is positioned for accelerating, and/or the like. As a further illustration, at least one of a height of the one or more vehicle accessories above a roadway or an angle of the one or more vehicle accessories with respect to the roadway can be determined. As an illustration, a strength of a magnetic field of a magnet attached to the one or more vehicle accessories can be determined. The height and/or angle can be determined based on the strength of the magnetic field. In one aspect, determining the strength of the magnetic field of the magnet attached to the one or more vehicle accessories can comprise determining a voltage caused by the magnetic field of the magnet. An example magnet can comprise a rare earth metal, such as neodymium. As an illustration, the one or more vehicle accessories can comprise a plow, such as a snow plow. In this scenario, determining the status information indicative of time periods when one or more vehicle accessories are engaged can comprise determining status information indicative of time periods when the plow is positioned for plowing.

At step 506, the location information and the status information can be provided to a device. For example, the location information and the status information can be transmitted on a wireless network, such as a cellular network. In one aspect, the device can be configured to estimate environmental conditions based on the location information and the status information. For example, the device can comprise a traffic simulator configured to produce a map indicating travel conditions on roadways or other travel areas (e.g., waterways, airways).

Figure 6:
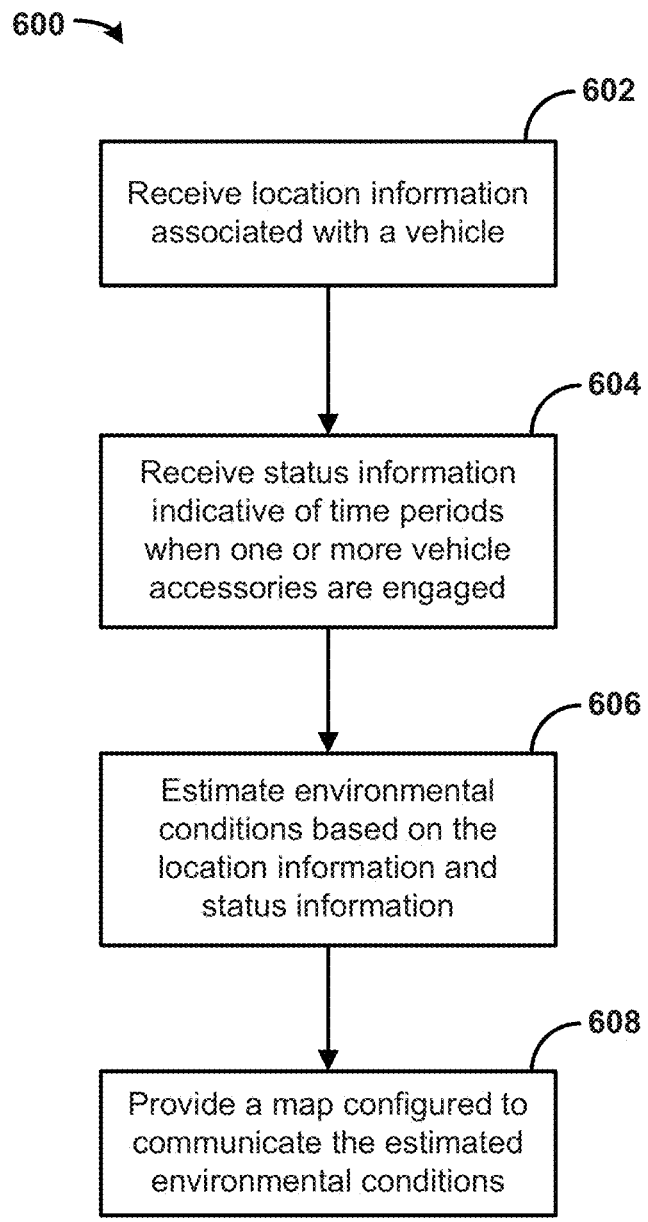
FIG. 6 is a flowchart illustrating yet another exemplary method for estimating environmental conditions.

FIG. 6 is a flowchart illustrating yet another exemplary method 600 for estimating environmental conditions. At step 602, location information associated with a vehicle can be received. For example, the location information can comprise location data, such as global positioning system data. The location information can comprise latitude, longitude, elevation, and/or other units of measurement. The location information can comprise the location data correlated with times when the vehicle was at the corresponding location.

At step 604, status information indicative of time periods when one or more vehicle accessories are engaged can be received. In one aspect, the one or more vehicle accessories can comprise a snow plow, grader, paver, vehicle brakes, vehicle accelerator, and/or the like. Status information can comprise positions or other information indicative of when the one or more accessories are engaged. For example, status information can indicate when a snow plow is positioned for plowing, when a paver is positioned for paving, when a grader is positioned for grading, when a vehicle brake is positioned for braking, when an accelerator is positioned for accelerating, and/or the like. For example, at least one of a height of the one or more vehicle accessories above a roadway or an angle of the one or more vehicle accessories with respect to the roadway can be received. As a further example, receiving status information can comprise receiving information indicative of a strength of a magnetic field of a magnet attached to the one or more vehicle accessories. For example, the information indicative of the strength of the magnetic field can comprise a voltage detected in a magnet.

At step 606, environmental conditions can be estimated based on the location information and the status information. For example, a time since at least a portion of a roadway was last plowed by the vehicle (e.g., or a vehicle accessory was otherwise engaged) can be determined. As an illustration, the status information (e.g. indicating that a vehicle's accessory was engaged in an operation, such as plowing) can be correlated with the location information to identify roadways affected by the engagement of the vehicle accessory. In one aspect, the environmental conditions can be estimated based on a weather report, such as an amount of snowfall accumulation in a region during a time period.

At step 608, a map configured to communicate the estimated environmental conditions can be provided. In one aspect, the map can show estimated driving conditions. For example, the map can indicate by pattern, color, shade, and/or the like estimated driving conditions on various roads.

Figure 7:
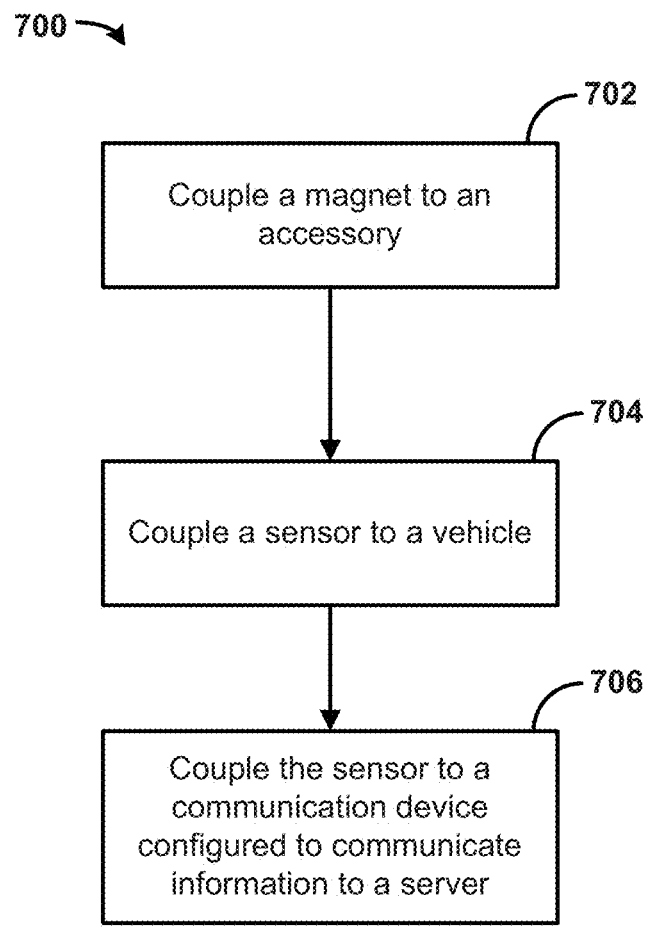
FIG. 7 is a flowchart illustrating another exemplary method for estimating environmental conditions.

FIG. 7 is a flowchart illustrating another exemplary method for estimating environmental conditions. In step 702, a magnet can be coupled to an accessory. The accessory can be a plow (e.g., snow plow), or other vehicle accessory. In step 704, a sensor can be coupled to a vehicle. In an aspect, the vehicle can be coupled to the accessory. For example, the accessory can be attached to the vehicle. The sensor can be configured to measure information based on the location of the magnet. For example, information can comprise measurements of a magnetic field of the magnet. In one aspect, measurements can comprise voltages caused, at least in part, by the magnetic field of the magnet. In step 706, a sensor can be coupled to a communication device configured to communicate information to a server.

Figure 8A:
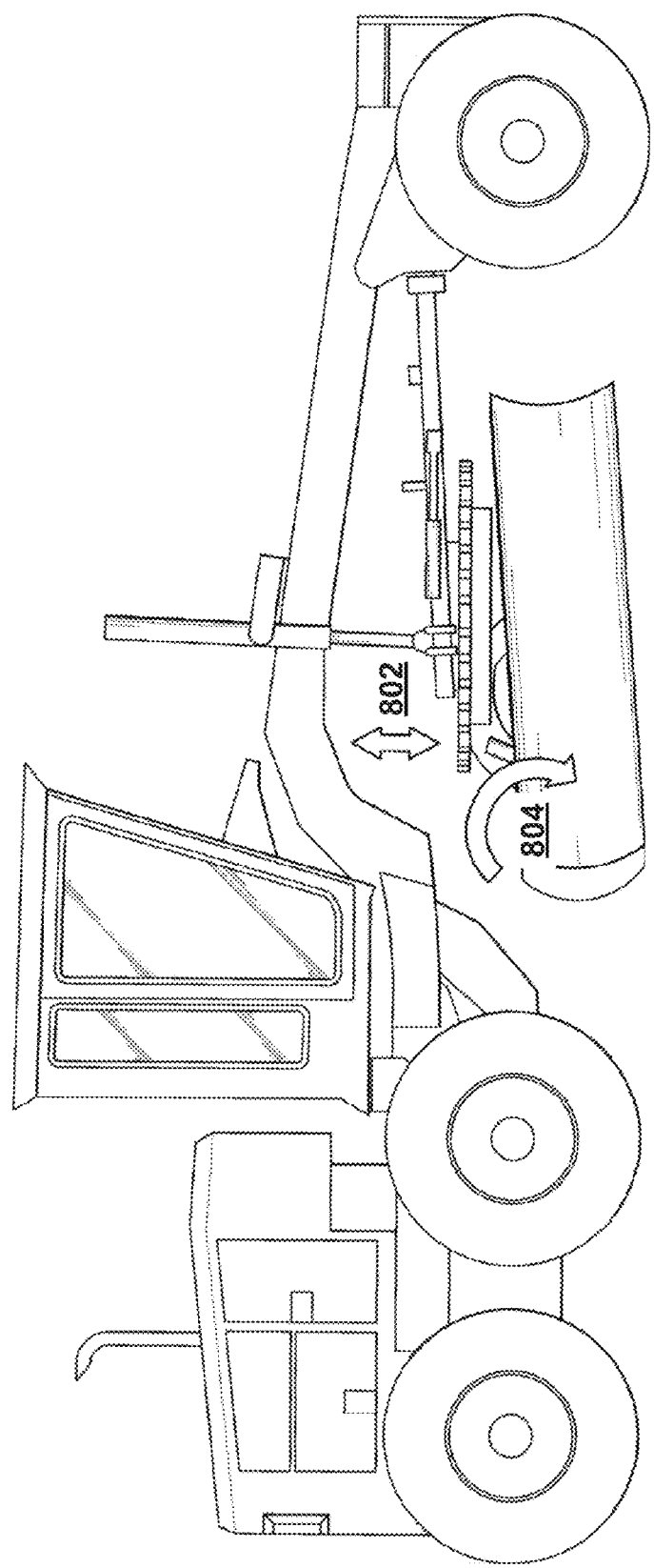
FIG. 8A shows an example of the moment arms for a road grader.
Figure 8B:
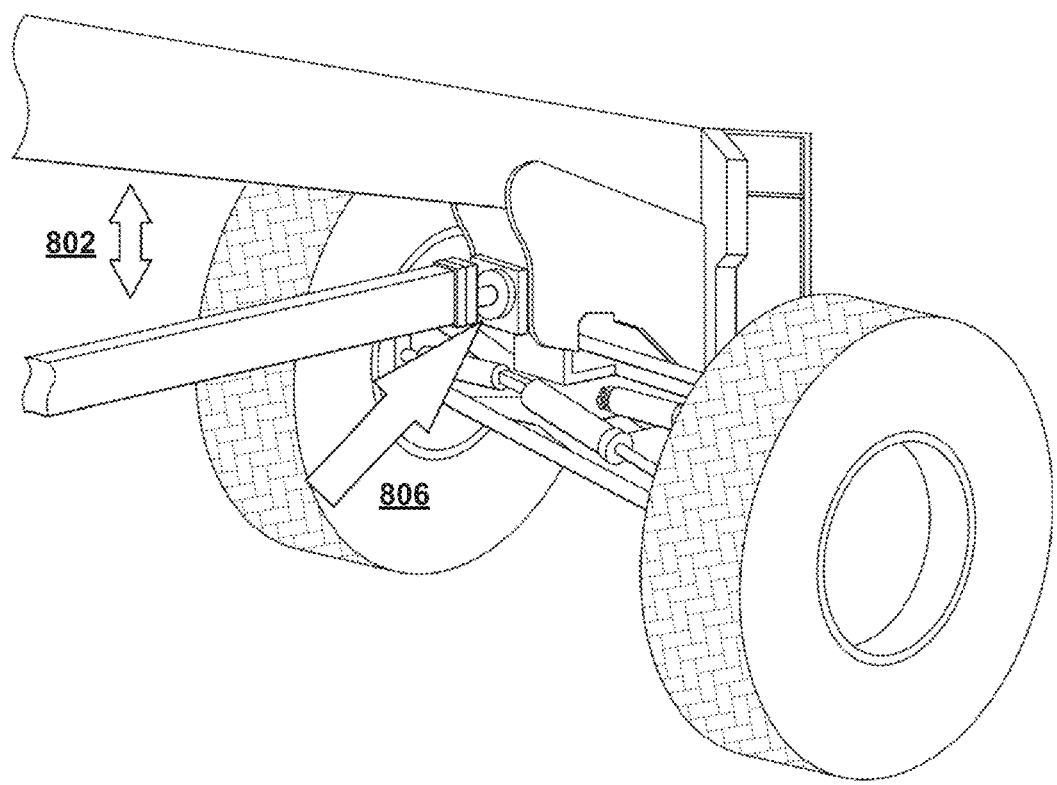
FIG. 8B shows the location of where a sensor could be placed on a road grader.
Figure 8C:
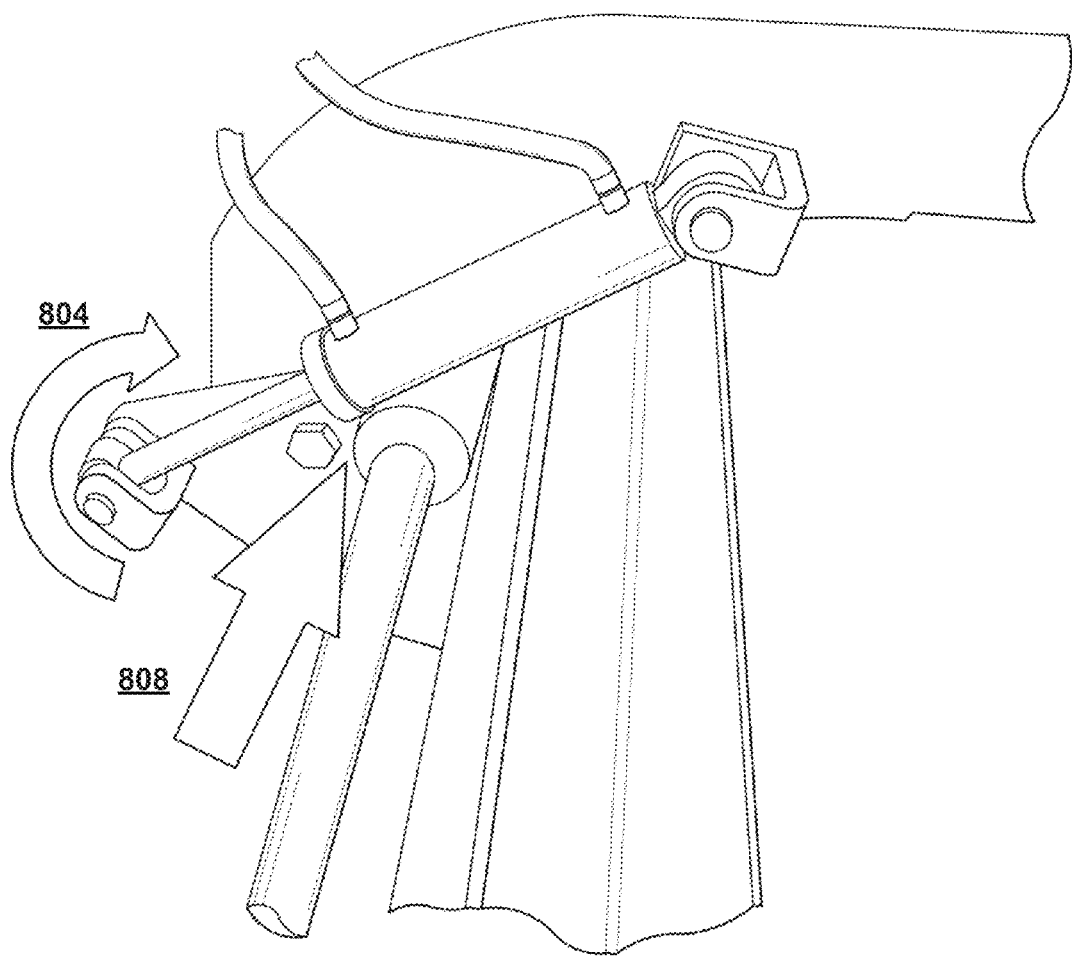
FIG. 8C shows another location where a sensor could be placed on a road grader.

FIG. 8A-8C are diagrams illustrating an example status unit configured to determine positions of accessories of a vehicles. For example, the status unit can determine the status of a plow (e.g., plow blade) attached to a vehicle. In one aspect, the status unit can determine position information to determine whether the plow is engaged in plowing snow. As an illustration, the status unit can determine position information by measuring angular displacement of hinged components which position a plow blade. In a common snow plow configuration, a vehicle can adjust the height of the plow blade and adjust the orientation (e.g., tilt) of the plow blade. As an illustration, a plow blade can be disengaged (e.g., raised from a roadway) by either increasing the height of the blade or by tilting the blade so the edge of the plow rotates upward and away from the ground. In an exemplary system, angles of the plow blade can be determined by measuring the linear displacement at the moment arm for each measured position. The moment arm can define the direction of movement of the plow blade. For example, the moment arm can define, at least in part, the distance between the sensor and the magnet, and can be used to determine an angle of rotation such as the angles described above. The range of displacement can be adjusted by moving the sensor closer to or further from the vertex. FIG. 8A shows an example of the moment arms 802 and 804 for a road grader while FIG. 8B and FIG. 8C show the locations 806 and 808 where sensors would be placed on the road grader.

A moment arm can provide a way to calculate an angular position by measuring a linear displacement. Thus, the moment arm can provide for a determination of the orientation of the blade. To illustrate the utility of moment arm measurements, consider the problem of attempting to measure the angle of a human elbow. Affixing a rotary encoder to the elbow can be a difficult way to measure the angle of an elbow, but instead the angle of the elbow can be determined by measuring the distance between the wrist and the shoulder. The shorter this distance is, the smaller the elbow angle is. In this example, the moment arm is the imaginary line segment between the wrist and the shoulder. In the case of the plow, affixing a mechanical rotary sensor to the joints of the blade mechanisms to determine the angle of these joints can be prohibitively difficult and unreliable. However, if a sensor is placed just a few inches away from the joints to measure the distance between the two steel members that are jointed together, the precise angle of the joint can be determined with a small linear measurement. It should be noted that the fact that a linear measurement at an angle arm can be used to determine the angle between two members should not preclude the inclusion of alternative sensing mechanisms. Example methods and systems of the present disclosure can use other measurement techniques such as other sensors to determine an angle of orientation of the snow plow.

In one aspect, the linear displacements of an accessory (e.g., snow plow blade) can be measured using fixed magnets and Hall Effect sensors. Hall Effect sensors can be installed with minimal if any modifications to the vehicle (e.g., no cutting or welding to the frame). Hall Effect sensors are minimally impacted by the accumulation of ice and snow on the plow and measurement apparatus. The Hall Effect sensor can provide an output voltage which can be linearly related to the magnetic flux penetrating the sensor element. By characterizing the magnetic field strength as a function of distance from the fixed magnet, the distance between the fixed magnet and the Hall Effect sensor can be determined by measuring the Hall Effect sensor output voltage. In one aspect, the sensor voltage can be read using an analog input on an ATMega328 microcontroller or other comparable controller.

In one aspect, the status unit can comprise at least two sensors. For example, a first sensor can be placed at location 806 shown in FIG. 8B. In one aspect, the first sensor can be configured to detect magnetic field (e.g., or voltage) changes based on the moment of the blade. A second sensor can be placed at location 808 as shown in FIG. 8C. The second sensor can be configured to detect magnetic field (e.g., or voltage) changes based on the moment of the lift arm. The use of two sensors can provide two degrees of freedom leading to a number of combinations for blade position not to exceed an inch. In one aspect, the sensors can be configured to report a linear measurement. By simply adding the two measured values and checking whether the sum is less than or equal to one, accurate predictions can be provided as to whether the blade is engaged (e.g., against the roadway) for removing snow.

Figure 9:
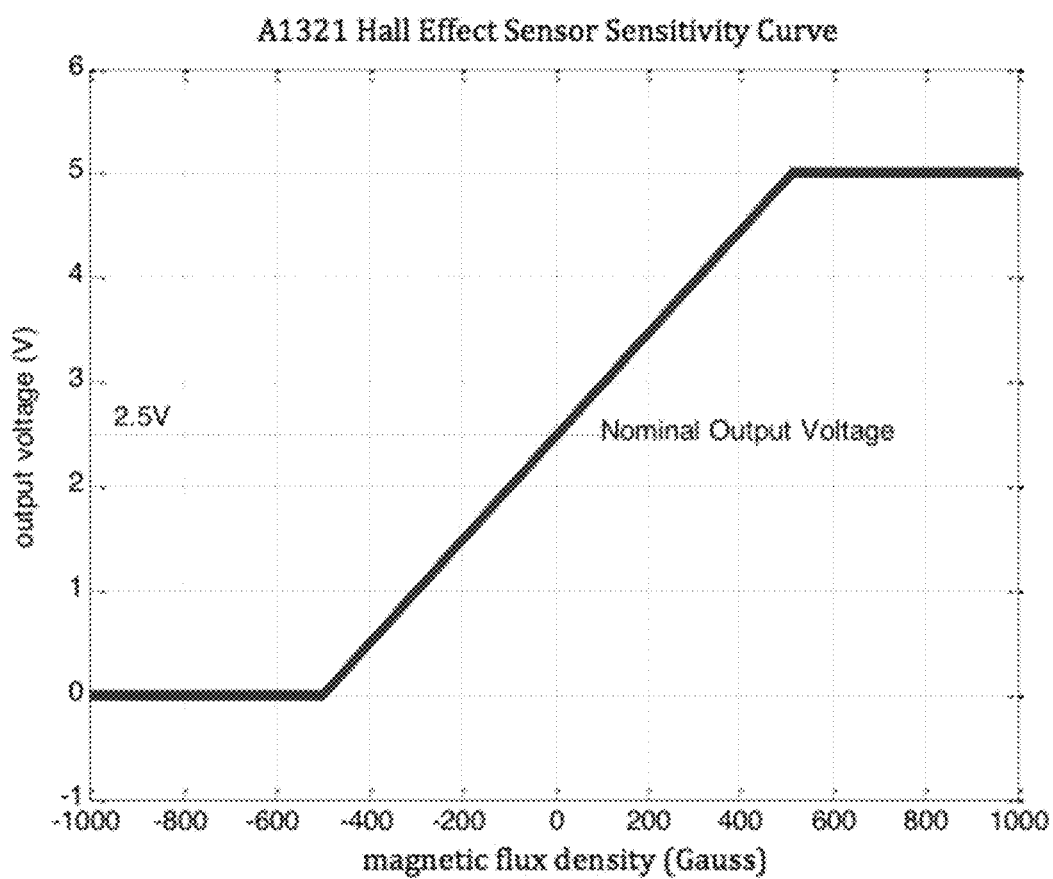
FIG. 9 is a graph illustrating a sensitivity curve for an example sensor.

FIG. 9 is a graph illustrating a sensitivity curve for an example sensor. In one aspect, the sensitivity curve relates to a Hall Effect Sensor. The Hall Effect sensor can comprise an A1321 Linear Hall Effect Sensor. This Hall Effect sensor can operate from the same power supply as the rest of the electronics, can be insensitive to mechanical stress, and can produce a very linear voltage output to magnetic flux density (Gauss). The A1321 can have a sensitivity of 5 mV/G. Nominal output voltage for the A1321 can be 2.5V (on 0 to 5V supplies). As shown in FIG. 9, full-scale voltage outputs of 5V and 0V can be produced under magnetic fields of 500 Gauss and −500 Gauss respectively.

Figure 10:
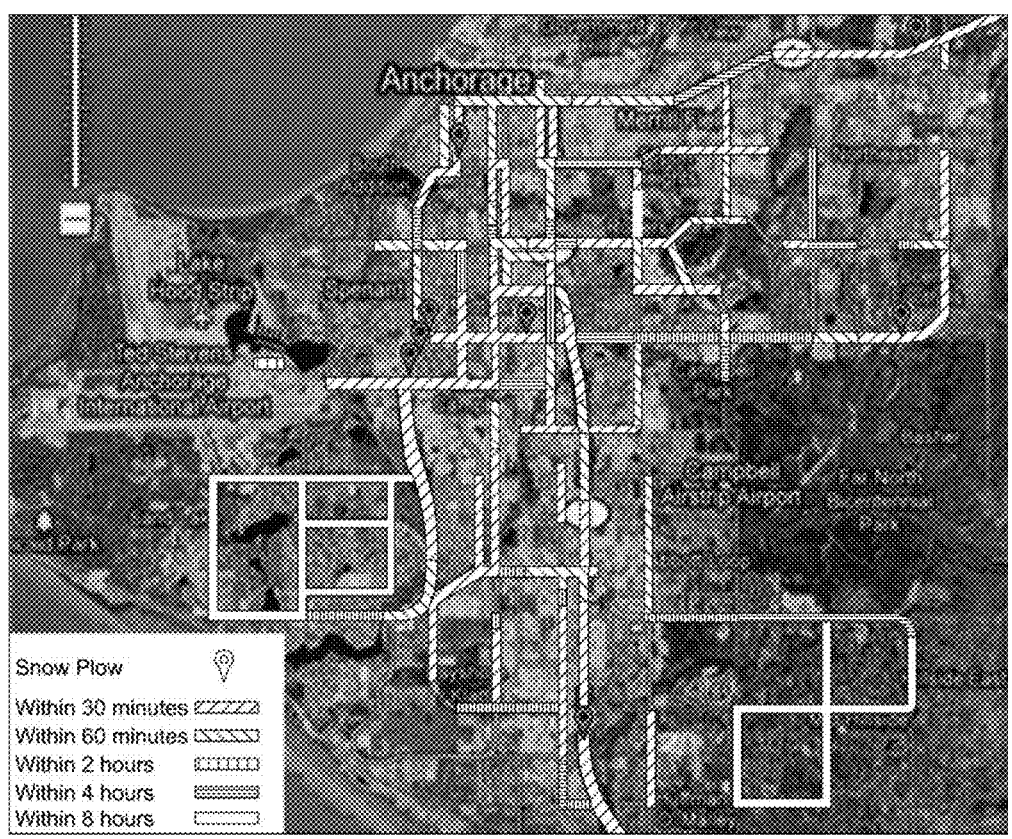
FIG. 10 is a top-down view of an example map.

FIG. 10 is a top-down view of an exemplary map. The map can display estimated environmental conditions. For example, the map can display estimated road conditions. As an illustration, once a vehicle accessory has been determined to be engaged (e.g., in plowing snow), the map can then display information indicative of road conditions. For example, the map can indicate a time since a vehicle accessory was last engaged on a roadway. As a further example, if the accessory is a plow, the map can indicate a time since a road was last plowed. By providing the time since the roads were plowed, the user can make an educated decision to choosing a path. In one aspect, the information can be displayed by overlaying weighted edges onto a third party mapping program, such as Google Maps. The weighted edges can be colored based on the time at which the road was plowed and represented by different colors. The color-coded lines can alert the user of the current road conditions.

Additionally, if weather information is provided, such as snow fall accumulation, prediction of snow accumulation can be reported. Without this prediction, the user can attempt to make an educated prediction of current road conditions based on other sources of snowfall information. If weather information is provided, the systems and methods can provide predictions of an amount of snow accumulation both before and after a road has been plowed. By providing the user with the most accurate depiction of current road conditions, the user can better be informed of the safest route. For example, if a road was plowed two hours ago in blizzard conditions, then the road may no longer be cleared of snow.

Figure 11:
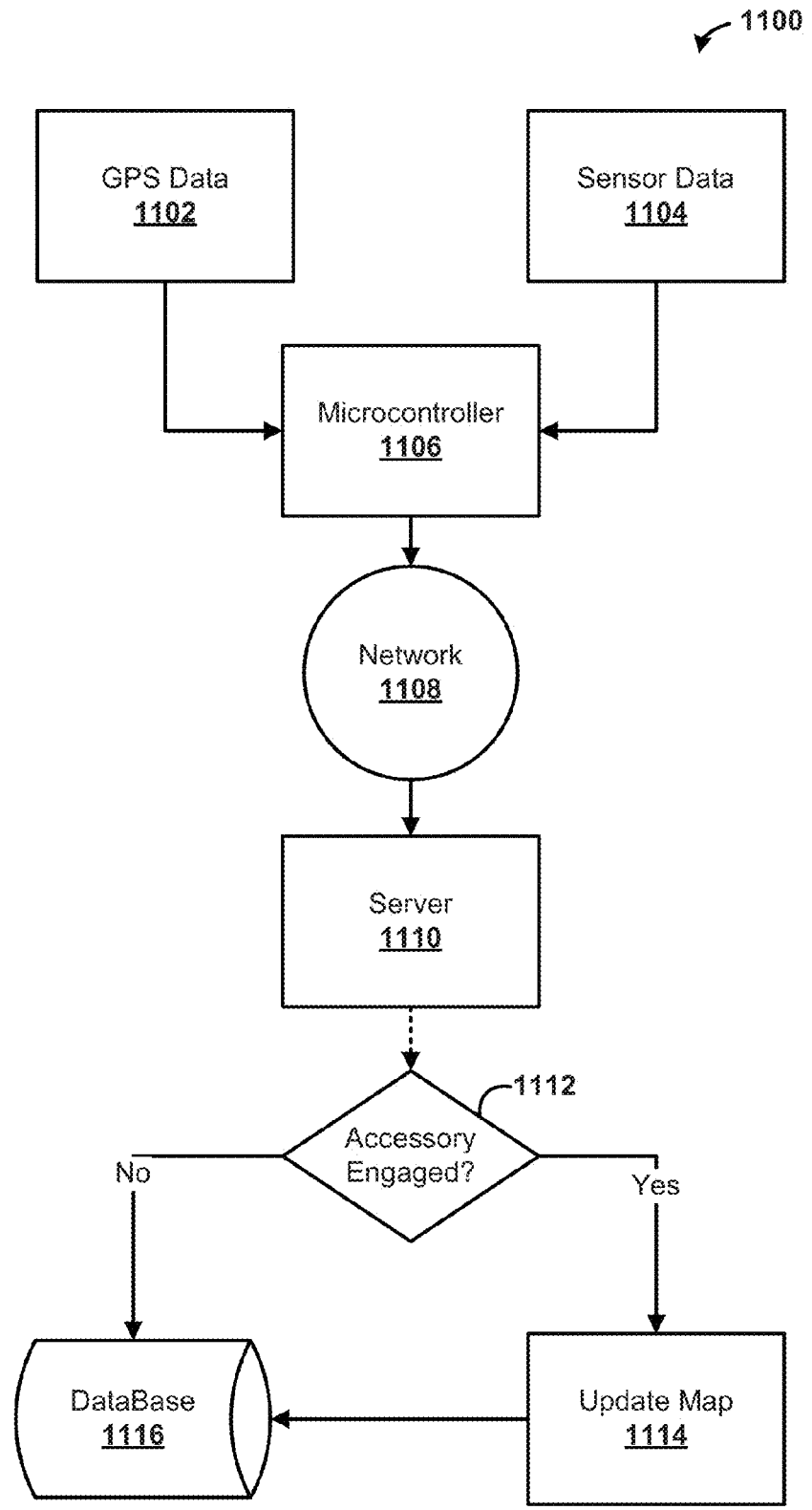
FIG. 11 is a flowchart illustrating an example software process.

FIG. 11 is a flowchart illustrating an example software process 1100. Generally, FIG. 11 shows a high-level illustration of the process 1100 in which the data can be gathered, sent, and rendered. GPS data 1102 and sensor data 1104 can be communicated to a microcontroller 1106. The microcontroller 1106 can communicate the GPS data 1102 and sensor data 1104 over a network 1108 (e.g., cellular network) to a server 1110. As an illustration, the server 1110 can comprise a traffic simulator, such as FreeSim. The server 1110 can be configured to aggregate traffic data and display the data via a web interface or other interface. The server 1110 can process the received data. In one aspect, at step 1112 a determination can be made as to whether an accessory is engaged (e.g., in plowing snow or other operation). The determination can be made based on the sensor data 1104. If the sensor data 1104 indicates that the accessory is engaged, then at step 1114 a map can be updated to show that activity relevant to the engagement of the accessory occurred on a particular map section. For example, the map can be updated to indicate where plowing occurred. The particular map section that is updated can be selected based on the GPS data 1102. Then at step 1116, the GPS data 1102 and sensor data 1104 can be stored in a database.

Figure 12:
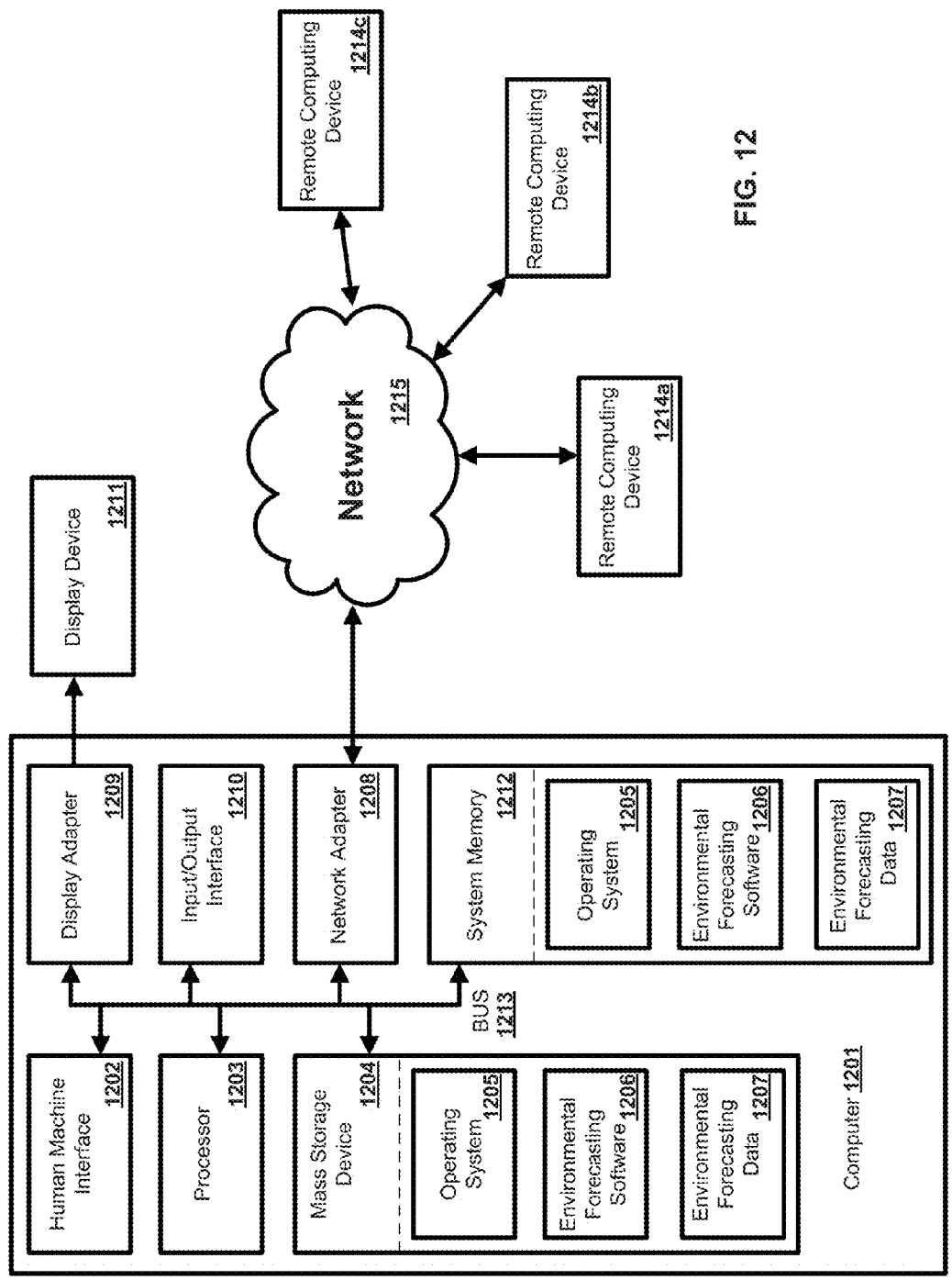
FIG. 12 is a block diagram illustrating an example computing environment.

In an exemplary aspect, the methods and systems can be implemented on a computer 1201 as illustrated in FIG. 12 and described below. By way of example, server 118 or controller 123 of FIG. 1 can be a computer as illustrated in FIG. 12. Similarly, the methods and systems disclosed can utilize one or more computers to perform one or more functions in one or more locations. FIG. 12 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1201. The components of the computer 1201 can comprise, but are not limited to, one or more processors or processing units 1203, a system memory 1212, and a system bus 1213 that couples various system components including the processor 1203 to the system memory 1212. In the case of multiple processing units 1203, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description can also be implemented over a wired or wireless network connection and each of the subsystems, including the processor 1203, a mass storage device 1204, an operating system 1205, environmental forecasting software 1206, environmental forecasting data 1207, a network adapter 1208, system memory 1212, an Input/Output Interface 1210, a display adapter 1209, a display device 1211, and a human machine interface 202, can be contained within one or more remote computing devices 1214a,b,c at physically separate locations, connected through buses of this form, in effect implementing a fully distributed system.

The computer 1201 typically comprises a variety of computer readable media. Exemplary readable media can be any available media that is accessible by the computer 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as environmental forecasting data 1207 and/or program modules such as operating system 1205 and environmental forecasting software 1206 that are immediately accessible to and/or are presently operated on by the processing unit 1203.

In another aspect, the computer 1201 can also comprise other removable/non-removable, volatile/non-volatile computer storage media. By way of example, FIG. 12 illustrates a mass storage device 1204 which can provide non-volatile storage of computer code, computer readable instructions, data structures, program modules, and other data for the computer 1201. For example and not meant to be limiting, a mass storage device 1204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1204, including by way of example, an operating system 1205 and environmental forecasting software 1206. Each of the operating system 1205 and environmental forecasting software 1206 (or some combination thereof) can comprise elements of the programming and the environmental forecasting software 1206. Environmental forecasting data 1207 can also be stored on the mass storage device 1204. Environmental forecasting data 1207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 1203 via a human machine interface 1202 that is coupled to the system bus 1213, but can be connected by other interface and bus structures, such as a parallel port, game port, an IEEE 1394 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computer 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computer 1201 via Input/Output Interface 1210. Any step and/or result of the methods can be output in any form to an output device. Such output can be any form of visual representation, including, but not limited to, textual, graphical, animation, audio, tactile, and the like. The display 1211 and computer 1201 can be part of one device, or separate devices.

The computer 1201 can operate in a networked environment using logical connections to one or more remote computing devices 1214a,b,c. By way of example, a remote computing device can be a personal computer, portable computer, smartphone, a server, a router, a network computer, a peer device or other common network node, and so on. Logical connections between the computer 1201 and a remote computing device 1214a,b,c can be made via a network 1215, such as a local area network (LAN) and/or a general wide area network (WAN). Such network connections can be through a network adapter 1208. A network adapter 1208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1205 are illustrated herein as discrete blocks, although it is recognized that such programs and components reside at various times in different storage components of the computing device 1201, and are executed by the data processor(s) of the computer. An implementation of environmental software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory, technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for estimating environmental conditions, comprising:
   determining location information associated with a vehicle based on data from a global positioning device;
   determining sensor information comprising a first portion generated by a first sensor attached to a main body of the vehicle or a mechanical arm supporting an accessory of the vehicle and a second portion generated by a second sensor attached to the main body or the mechanical arm, wherein the sensor information is indicative of movement of one or more corresponding magnets attached to the accessory; and
   providing the location information and the sensor information to a remote device configured determine, based on the sensor information, when the accessory is engaged in plowing snow and configured to estimate environmental conditions based on the location information and the sensor information, wherein the remote device is configured to determine when the accessory is engaged in plowing by comparing the first portion to a first threshold representing a first angle indicative of the accessory being in contact with a surface and comparing the second portion to a second threshold representative of a second angle indicative of the accessory being positioned to push material to a side of the roadway.

2. The method of claim 1, wherein determining whether the accessory is engaged in plowing comprises determining a height of the one or more vehicle accessories above a roadway.

3. The method of claim 1, wherein determining whether the accessory is engaged in plowing comprises determining a voltage caused by the magnetic field of the one or more magnets.

4. The method of claim 1, wherein the one or more magnets comprise at least one rare earth metal.

5. The method of claim 1, wherein the accessory comprises a plow, and wherein determining whether the accessory is engaged in plowing comprises determining status information indicative of time periods when the plow is positioned for plowing.

6. The method of claim 1, wherein providing the location information and the sensor information to the remote device comprises transmitting the location information and the sensor information on a wireless network.

7. The method of claim 1, wherein the accessory comprises a blade attached to the mechanical arm.

8. A method for estimating environmental conditions, comprising:
   receiving, a first device, location information associated with a vehicle from a global positioning system device on the vehicle, wherein, the first device is remote from the vehicle;
   receiving, by the first device, sensor information comprising a first portion generated by a first sensor attached to a main body of the vehicle or a mechanical arm supporting an accessory of the vehicle and a second portion generated by a second sensor attached to the main body or the mechanical arm, wherein the sensor information is indicative of movement of one or more corresponding magnets attached to the accessory;
   comparing, by the first device, the first portion to a first threshold representing a first angle indicative of the accessory being in contact with snow;
   comparing, by the first device, the second portion of the sensor data to a second threshold representative of a second angle indicative of the accessory being positioned to push material to a side of the roadway;
   determining, by the first device and based on the comparing of the first portion and the second portion, status information indicative of time periods when the accessory is engaged in plowing snow;
   estimating predicted travel conditions of a road based on the location information and the status information; and providing a map configured to communicate the predicted travel conditions, wherein the map comprises a visual indicator representing a level of difficulty of travel on a road based on the predicted travel conditions.

9. The method of claim 8, wherein estimating environmental conditions comprises determining a time since at least a portion of a roadway was last plowed by the vehicle.

10. The method of claim 8, further comprising determining, by the first device and based on the sensor information, at least one of a height of the the accessory above a roadway or an angle of the the accessory with respect to the roadway.

11. The method of claim 8, wherein receiving, by the first device, sensor information from the vehicle comprises receiving information indicative of a strength of a magnetic field of the one or more magnets attached to the accessory.

12. The method of claim 8, wherein the predicted travel conditions comprise first predicted road conditions for a first road and second predicted road conditions for a second road.

13. The method of claim 8, further comprising determining a time since the road was plowed by the vehicle based on the status information and the location information, wherein the predicted travel conditions are based on the time since the road was plowed.

14. The method of claim 13, further comprising determining an amount of snow fall related to the road based on information from a weather service, wherein the predicted travel conditions for the road are based on the snow fall information and the time since the road was plowed.

15. A system, comprising:
  an accessory coupled to a vehicle, wherein the accessory is configured for managing snow;
  a location unit configured to determine location information indicative of locations of the vehicle based on a global positioning system device on the vehicle;
  a sensor unit configured to generate sensor information and comprising a first sensor attached to a main body of the vehicle or a mechanical arm supporting the accessory and a second sensor attached to the main body of the vehicle or the mechanical arm supporting the accessory, wherein the first sensor generates a first portion the sensor information indicative of the movement in a first direction of one or more corresponding magnets attached to the accessory, and wherein the second sensor generates a second portion of the sensor information indicative of movement in a second direction of one or more corresponding magnets attached to the accessory; and
  a communication unit configured to transmit the location information and the sensor information to a remote device configured to determine, based on the sensor information, times when the accessory is engaged in plowing, wherein the remote device is configured to determine when the accessory is engaged in plowing by comparing the first portion to a first threshold representing a first angle indicative of the accessory being in contact with a surface and comparing the second portion to a second threshold representative of a second angle indicative of the accessory being positioned to push material to a side of the roadway.

16. The system of claim 15, wherein the remote device is configured to determine, based on the first portion of the sensor information, a height of the accessory above the roadway.

17. The system of claim 15, wherein the first sensor and the second sensor are configured to determine voltages caused by at least a portion of a magnetic field of the one or more magnets.

18. The system of claim 15, wherein the one or more magnets comprise neodymium.

19. The system of claim 15, wherein the communication unit is configured to transmit the location information and sensor information to the remote device through a wireless network.

* * * * *